US012421102B2

(12) United States Patent
Engelke

(10) Patent No.: US 12,421,102 B2
(45) Date of Patent: Sep. 23, 2025

(54) RIDING SADDLE WITH TWO-STAGE GIRTH STRAPPING SYSTEM

(71) Applicant: Carsten Engelke, Lindwedel (DE)

(72) Inventor: Carsten Engelke, Lindwedel (DE)

( * ) Notice: Subject to any disclaimer, the term of this patent is extended or adjusted under 35 U.S.C. 154(b) by 0 days.

(21) Appl. No.: 18/156,644

(22) Filed: Jan. 19, 2023

(65) Prior Publication Data

US 2023/0227304 A1 Jul. 20, 2023

(30) Foreign Application Priority Data

Jan. 20, 2022 (DE) ......................... 102022200661.5

(51) Int. Cl.

*B68C 1/14* (2006.01)
*B68C 1/02* (2006.01)
*B68C 1/04* (2006.01)
*B68F 1/00* (2006.01)

(52) U.S. Cl.

CPC .................. *B68C 1/14* (2013.01); *B68C 1/02* (2013.01); *B68C 1/025* (2013.01); *B68C 1/04* (2013.01); *B68C 2001/046* (2013.01); *B68C 2001/142* (2013.01); *B68F 1/00* (2013.01)

(58) Field of Classification Search

CPC ....... B68C 2001/142; B68C 1/14; B68C 1/04; B68C 1/025; B68C 1/02
See application file for complete search history.

(56) References Cited

U.S. PATENT DOCUMENTS 28,867 A * 6/1860 Jenifer ...................... B68C 1/02 54/44.1
1,069,822 A * 8/1913 Sievert .................... B68C 1/025 54/44.7
1,462,885 A * 7/1923 Hawkins ................ B68C 1/025 54/46.1
2,239,764 A 4/1941 Vordemberge
3,286,440 A * 11/1966 Walker ...................... B68C 1/02 D30/135
3,371,467 A * 3/1968 Salisbury, III ............ B68C 1/02 54/44.7
3,641,739 A * 2/1972 Stubben .................... B68C 1/14 54/44.1
4,287,705 A * 9/1981 Frost ......................... B68C 1/02 54/44.1
4,502,266 A * 3/1985 Friedson ................... B68C 1/02 54/46.1

(Continued)

FOREIGN PATENT DOCUMENTS

DE 102004022048 A1 11/2005
DE 202014006159 U1 * 11/2014 ............... B68C 1/02

(Continued)

OTHER PUBLICATIONS

European Search Report from the corresponding European Patent Application No. EP 23 15 2317, dated May 31, 2023.

*Primary Examiner* — Jessica B Wong
(74) *Attorney, Agent, or Firm* — Greer, Burns & Crain, Ltd.; Steven P. Fallon

(57) ABSTRACT

Riding saddle having a two-stage, additionally elastic girth for fastening on a horse. Due to the two-stage, preferably elastic girthing, the riding saddle has the advantage of a firm fit on the horse's back. It has shown that due to the girthing according to the invention, an otherwise identical saddle slides forward significantly less on the horse during riding.

11 Claims, 2 Drawing Sheets

(56) References Cited

U.S. PATENT DOCUMENTS

Figure 1:
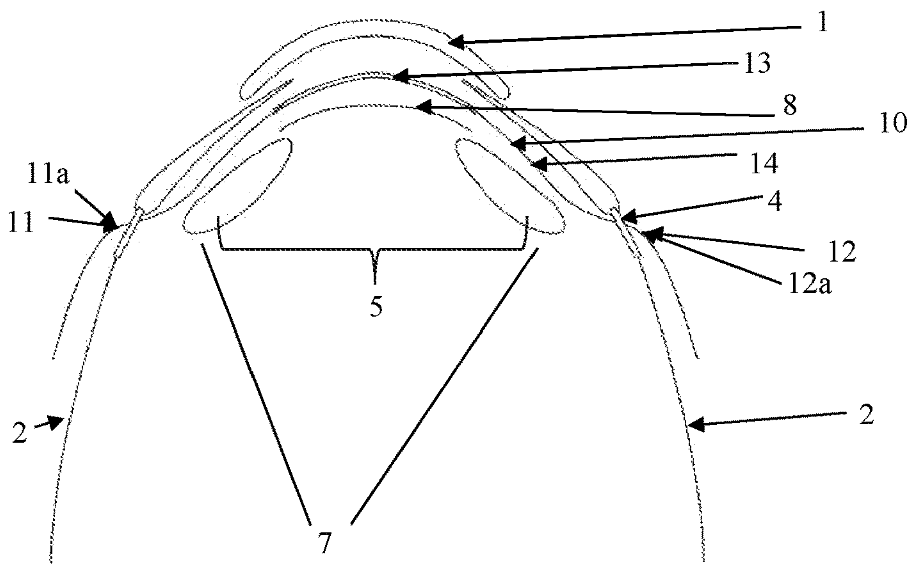

| | | | | |
|---|---|---|---|---|
| 4,570,424 | A | 2/1986 | Simpson | |
| 4,905,458 | A | 3/1990 | Johnston et al. | |
| 5,195,306 | A * | 3/1993 | Hadlock | B68C 1/025 54/46.1 |
| 5,799,473 | A * | 9/1998 | Goblet | B68C 1/025 54/44.1 |
| 2006/0117720 | A1* | 6/2006 | DeCosemo | B68C 1/02 54/44.1 |
| 2010/0269459 | A1* | 10/2010 | Woods | B68C 1/14 54/44.1 |

FOREIGN PATENT DOCUMENTS

| | | | |
|---|---|---|---|
| DE | 102015113212 | A1 | 2/2017 |
| EP | 0466270 | A1 * | 1/1992 |

* cited by examiner

RIDING SADDLE WITH TWO-STAGE GIRTH STRAPPING SYSTEM

The application claims priority of German patent application 10 2022 200 661.5, filed on 20 Jan. 2022.

The invention relates to a riding saddle having a two-stage, optionally additionally elastic girth for fastening the saddle on a horse. Due to the two-stage, preferably elastic girth, the riding saddle has the advantage of a firm fit on the horse's back. It has shown that due to the girth according to the invention, an otherwise identical saddle slides forward significantly less on the horse during riding.

The saddle according to the invention has a saddle tree, preferably with tree tips at its front end, and a seat surface mounted on the saddle tree, which is padded towards the saddle tree and extends along a longitudinal axis of the saddle tree and of the saddle from its front end to its rear end and is preferably concave, e.g. having pommel at the front end and/or cantle at the rear end. The saddle tree is concave on its chamber opening facing a horse and is convex on the side facing the seat surface. On each side, a stirrup leather is attached to the saddle, in particular by means of a stirrup holder, e.g. in the form of a short strap, preferably in the form of a hook, wherein one end of a stirrup leather can be fixed to the stirrup holder, to the opposite end of which stirrup leather a stirrup is attached. The stirrup holder on each side can be attached directly to the saddle tree, e.g. by a rigid connection, or can be indirectly connected to the saddle tree, e.g. by the stirrup holder being attached to an element of the saddle which is connected to the saddle tree, e.g. between the saddle tree and the seat surface. For attachment to a horse, at least one girth strap, also called a saddle strap, are attached to the saddle, preferably to the saddle tree, on each side, to which a saddle girth is attachable, which can be tightened around the belly of a horse upon placement of the saddle on the horse's back and forms a girthing. The longitudinal axis of the saddle or resp. of the saddle tree extends along the horse's back upon placement of the saddle on a horse. A saddle tree can be single-pieced and can e.g. consist of plastic, optionally fiber-reinforced.

Generally, a saddle is adapted to a horse so that when the saddle is placed on the horse, the seat surface has a desired inclination to the horizontal between the front and the rear end or resp. along the longitudinal axis.

U.S. Pat. No. 2,239,764 A describes a riding saddle having two girth straps on each side, which taper in a V-shape towards a girth connector on which the girth straps are slidably guided in order to guide the saddle straps at the apex of their V-shape slidably relative to one another on the girth connector. The girth straps can include an elastic intermediate piece. A saddle girth, which is passed under the horse's belly when the saddle is loaded against the horse's back, connects the girth connectors lying on opposite sides, in which the girth straps are guided in a displaceable manner relative to one another.

The object of the invention lies in the provision of a saddle having a girth that allows a close contact of the saddle with a horse, preferably a girth that makes the strain of tightening a girth running under the horse's belly more comfortable for the horse.

The invention achieves the object by the features of the claims and in particular by a riding saddle having a seat surface which is arranged on the convex side of a saddle tree and opposite to the seat surface having a concave chamber opening with saddle panels mounted therein which face a horse's back when saddling up, wherein at least one girth strap each is mounted on opposite sides of the saddle, in particular on its saddle tree, which at least one girth strap can be connected to opposite ends of a saddle girth, wherein between the saddle panels and the saddle tree an additional, preferably elastic strap is arranged, of which at least a first end is connectable to one of the girth straps and the opposite second end of the additional strap is connectable to the other girth strap or to the saddle tree on its side lying opposite to the first end of the additional strap. Preferably, the opposite ends of the additional strap, i.e. the first end thereof and the second end lying opposite thereto, are each connectable to one of the opposite girth straps.

Further, the invention relates to the use of the strap as an additional strap on a saddle, as well as to a method of manufacture for the production of a saddle by attaching the strap as an additional strap between, on the one hand, the saddle tree and, on the other hand, the saddle panels of a saddle and preferably its chamber leather, in particular with the ends of the strap on at least one, preferably on both of the opposite girth straps.

Preferably, at least one, preferably both, of the opposite ends of the additional, preferably elastic strap are connectable to one or both of the girth straps at differently positioned attachment points along the elastic strap and/or along a girth strap. Thus, the section of the additional strap extending between its attachment points on the opposite girth straps can be adjusted to at least two lengths. One or both of the ends of the additional strap can be connectable by means of a retainer fixable along the additional strap at differently positioned attachment points. Such a retainer can e.g. be a pin which is insertable into one of at least two recesses spaced along the additional strap and which engages a recess of a girth strap or which is loaded against a connector connected to a girth strap.

Preferably, the saddle panels mounted in the chamber opening are spaced apart from one another at a distance on both sides of the center of the chamber opening or of the saddle so as to each rest beside the spine of a horse. Preferably, the saddle panels are connected to a chamber leather and the elastic strap runs between saddle panels and optional chamber leather on one side and the saddle tree on the other side. Preferably, the additional strap is arranged in a loose and/or longitudinally displaceable manner between the saddle tree on the one side and the saddle panels and a connecting chamber leather on the other side. The saddle panels beside the additional strap can be connected to the saddle tree.

Preferably, the girth straps have a recess through which the elastic strap is guided. Generally preferably, the elastic strap runs in parallel, more preferably at least sectionally congruent with the girth straps.

The additional strap can have at least two spaced-apart, preferably elastic, partial straps. The additional strap can be elastic over its entire length. Preferably, the additional strap is elastic substantially only in its section located along the saddle panels or in its section extending between the saddle panels, for example in the section over which the chamber leather extends. An elastic section of the additional strap can be, for example, a tension spring that is stretchable under tensile load, e.g. made of rubber, elastic fabric, or spring steel. Preferably, the additional strap, inelastic or preferably elastic, has a wide bearing surface, which in parallel to the longitudinal axis of the saddle makes up 10% to 25%, e.g. 15% or 20%, of the length of the saddle panels, e.g. 10-15 cm wide, on the saddle panels, e.g. up to a width of 50%, preferably 75% or 90% of the extension of the saddle panels in parallel to the longitudinal axis of the saddle. Therein, the width of the additional strap is determined in perpendicular to the additional strap in the plane of contact with the saddle panel and/or is the width running in parallel to the longitudinal axis of the saddle tree. Generally preferably, the additional strap runs in a straight line and with at least its first end, preferably with both ends, congruent and/or in parallel to at least one of the girth straps, preferably to both girth straps.

When tightening the girth, the saddle according to the invention causes the load for the horse, especially against its back, to be stretched in time or to occur less jerkily. The temporal extension of the occurrence of the load that the saddle and saddle girth exert against the horse upon tightening the girth appears to be more comfortable for the horse and, moreover, leads to a tighter, more matching fit of the saddle to the horse's back. When tightening the saddle girth, which is connected to the opposite girth straps, the additional strap first presses the saddle panels against the horse's back, and then the tree by means of the girth of girth straps and saddle girth.

The additional strap, which is preferably elastic, in the unloaded state between the girth straps is preferably shorter than the way between the opposite attachment points of the additional strap at its opposite ends along the girth straps when they are stretched, in particular when they are stretched along a horse away from the saddle with the saddle put on and/or when none of the girth straps is loaded by the additional strap towards the saddle.

When tightening the saddle girth, the saddle panels are loaded against the horse's back by the additional strap before the saddle tree is subsequently loaded against the horse's back by means of the girth straps attached thereto. Thereby, the load against the horse that occurs when tightening the saddle girth is distributed over the phase of tensioning the elastic strap and the subsequent loading of the saddle tree when tensioning the girth straps by means of the saddle girth.

Generally preferably, the additional strap has a length between its ends, one of which is connectable to one of the girth straps and one of which is connectable to the opposite girth strap or to the saddle tree beyond the saddle panels, which length is set up such that when the girth straps are loaded, in particular by tightening a saddle girth connecting the girth straps, first the saddle panels and then the saddle tree are loaded against a horse's back.

Due to the additional strap which runs on the concave side of the saddle tree and which loads the saddle panels independently of the saddle tree in the direction away from the saddle tree, resp. against a horse's back, the saddle according to the invention has a firmer fit on the horse with the same number of girth straps and saddle girths than an otherwise identical saddle without the additional strap. This is because due to the additional strap, the saddle according to the invention is set up to load the saddle panels against the horse's back independently of the saddle tree, while the girth straps load the saddle tree against the horse's back. Therein, the saddle has the advantage that the same saddle girth connects an additional strap and a pair of opposing girth straps each. Optionally, therefore, the saddle according to the invention can be combined and used with only one saddle girth.

In the development of the saddle according to the invention, it has shown that, particularly in the case of horses which are otherwise reluctant to have the saddle girth of a riding saddle tightened, the tightening of the saddle girth for a tight fit of the saddle is more likely tolerated and results in a better fit when the saddle girth is tightened for the first time. In particular, in the preferred embodiment of the additional strap as an additional elastic strap, the saddle according to the invention allows a good freedom of movement for the horse even with a tight fit of the saddle.

The additional strap between its attachment points on the opposite girth straps has a length which is stretched in the loaded state in which the girth straps are loaded away from the saddle by a saddle girth, in particular are pulled away from the saddle. In the loaded state, the additional, preferably elastic, strap is stretched between its attachment points on the opposite girth straps and the additional strap loads the saddle panels away from the saddle tree and toward the horse's back. In the unloaded state, the elastic strap between its attachment points on the opposite girth straps can have a length that is shorter than the distance between its attachment points along the girth straps and between the saddle panels and chamber leather on the one side and the saddle tree on the other side, so that, for example in the unloaded state, the additional elastic strap has a length in which it pulls the girth straps at the attachment points toward the saddle tree.

The additional, preferably elastic, strap is preferably fixed at attachment points on one girth strap each on opposite sides of the saddle, or is fixed at one girth strap and with the other end is fixed at the saddle tree beyond the saddle panels and the chamber leather arranged therebetween. One of the attachment points can be formed by a non-detachable connection, e.g. riveting or sewing. At least one, preferably both, of the attachment points are formed by an adjustable connection that is, for example, releasable and closable in at least two positions. The adjustable connection can be formed, for example, by at least one eyelet, preferably by at least two eyelets which are arranged with a spacing on the elastic strap, by at least one eyelet, preferably by at least two eyelets arranged with a spacing on a girth strap, and a releasable connecting element which e.g. is a latching pin. The connection can be formed such that it is only established by the connecting element upon a tensile load away from the saddle. Therefore, the connecting element can be arranged in an eyelet which is loaded against another eyelet under tensile load of a girth strap. In general, the connecting element can be arranged such that it e.g. is not locked without tensile load of a girth strap, and so that it is easily releasable and positionable in another eyelet.

An eyelet arranged on a girth strap can e.g. be the eyelet of a girth strap through which a section of the girth strap connected to the saddle tree, e.g. a loop, passes. Therein, the elastic strap can be arranged through the same loop through which a section of the girth strap passes.

In combinations of the saddle according to the invention with a saddle girth, the girth itself can be elastically stretchable, preferably not elastically stretchable, e.g. a leather girth.

The invention is now described with reference to the figures, which schematically show in FIG. 1 components of a saddle according to the invention, FIGS. 2A and 2B a preferred additional elastic strap, FIG. 3 a latching pin and in FIG. 4 a preferred attachment point.

In the figures, identical reference numerals denote functionally identical elements, the additional strap is representatively designated as an elastic strap.

FIG. 1 shows, in cross-section with respect to the longitudinal axis of a saddle tree 1, girth straps 2 attached to opposite sides 1*a*, 1*b* of the saddle tree 1, the sections 3 of which girth straps 2 are attached to the saddle tree 1. The sections 3 of each girth strap 2 can e.g. form a Y-girth, which in the form of a loop runs through an eyelet 4 of each girth strap 2. In the chamber opening 5, saddle panels 7 are connected to the saddle tree 1 on both sides of the longitudinal axis 6 (perpendicular to the drawing plane). The saddle panels 7 are connected to one another by means of a chamber leather 8 which extends over the chamber opening 5 on both sides of the longitudinal axis 6.

The elastic strap 10 runs between the saddle tree 1 and the saddle panels 7 with the chamber leather 8, which elastic strap 10 is fixed at opposite attachment points 11, 12 by means of a girth strap in each case. The attachment points 11, 12 can be formed by the eyelets 4 or can be arranged along the girth straps 2 at a greater distance from the saddle tree 1. Therein preferably, one attachment point 11 forms a first end 11*a* of the strap 10, the opposite attachment point 12 forms a second end 12*a* of the strap.

The elastic strap 10 in its section extending between the saddle panels 7 and/or along the chamber leather 8 can have an elastic section 13, for example a tension spring, e.g. made of rubber, elastic fabric or spring steel, and apart from that can be non-stretchable, e.g. made of leather or nylon fabric.

Figure 2A:
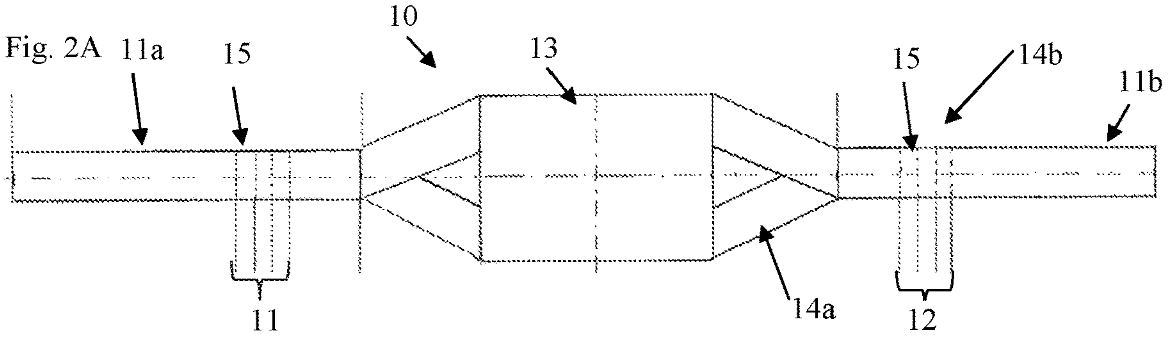

FIG. 2A shows an elevation top view onto an embodiment of an elastic strap 10 which has an elastic section 13 extending preferably in the spacing between the saddle panels 7. The elastic section 13, for example made of rubber, is connected at opposite ends to non-elastic sections 14. The non-elastic sections 14 can have, as shown here, a connecting region 14*a* which in a Y-shape connects non-elastic sections 14 to the wider elastic section 13.

As a part of attachment points, the elastic strap 10 has eyelets 15 arranged at opposite ends, here as preferred at least two spaced eyelets 15 at each of the opposite attachment points 11, 12 at opposite ends 11*a*, 11*b*.

Figure 2B:
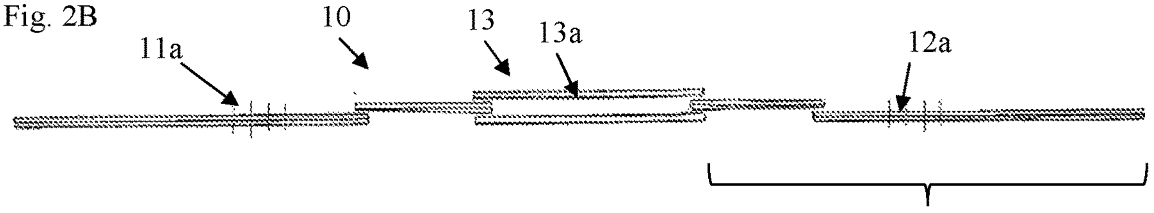

FIG. 2B shows for the embodiment of FIG. 2A rotated by 90° in side view that the elastic section 13 can consist of at least two parallel elements 13*a*, in particular of two parallel tension springs.

Figure 3:
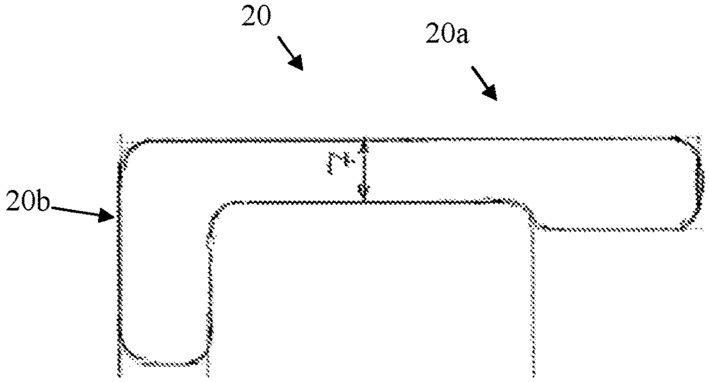

FIG. 3 shows an embodiment of a latching pin 20 that can be pushed through one of the eyelets 15 of the elastic strap 10, when the eyelet 15 is arranged on the section 14*b* of the elastic strap 10 facing away from the saddle tree 1, and adjacent to an eyelet 4 attached to a girth strap 2. Therein, the latching pin 20 can have a long leg 20*a* that is insertable into one of the eyelets 15 of the elastic strap 10, and a short leg 20*b* that serves as a handle and forms a stop on the elastic strap 10.

Figure 4:
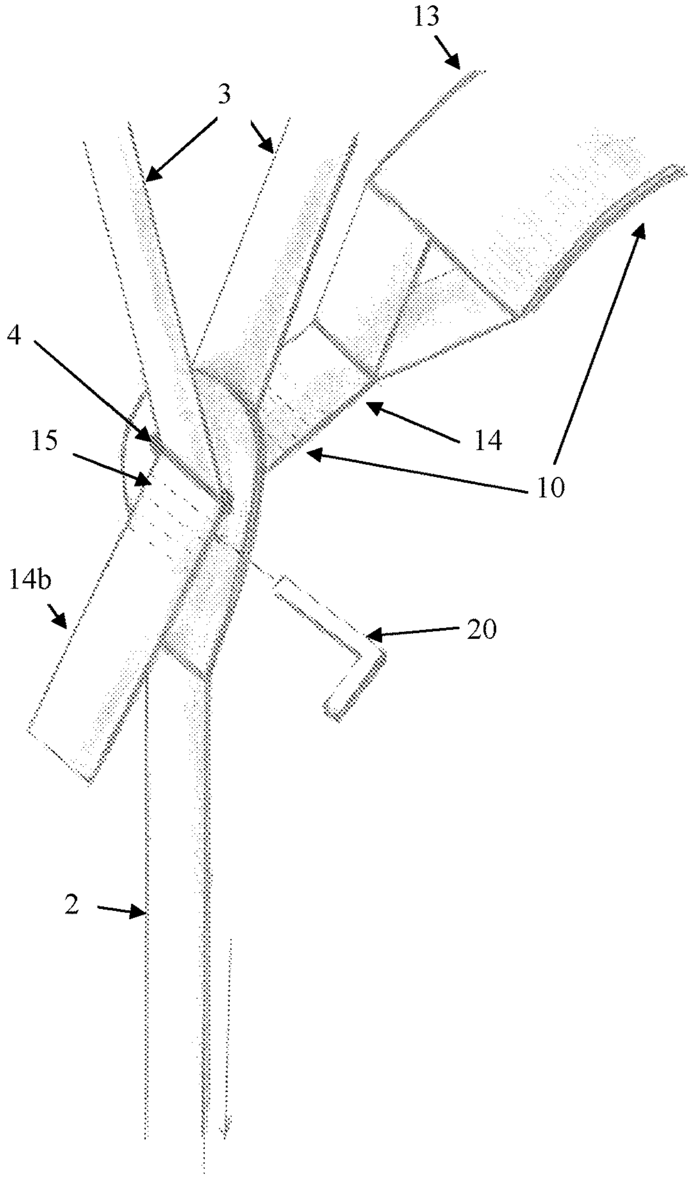

FIG. 4 shows a preferred embodiment of the attachment points 11, 12 with a Y-shaped section 3 of the girth strap 2, which Y-shaped section 3 is arranged as a loop through an eyelet 4. The elastic strap 10 has a non-elastic section 14 extending through said eyelet 4, wherein at least one of the eyelets 15 of the elastic strap 10 or of its non-elastic section 14 is arranged on the section 14*b* of the elastic strap 10 facing away from the saddle tree 1 or from the elastic section 13. A latching pin 20 can be pushed through one of the eyelets 15 arranged on the section 14*b* facing away from the elastic section 13 of the elastic strap 10 to form one of the attachment points 11, 12.

The invention claimed is:

1. A saddle, comprising a saddle tree, at least one first girth strap fixed on one side of the saddle, at least one second girth strap fixed on an opposite side of the saddle, a chamber opening having saddle panels mounted therein, and a additional strap arranged between the saddle tree and the saddle panels, a first end of the additional strap being connected to the at least one first girth strap and an opposite second end of the additional strap being connected to the at least one second girth strap, wherein at least one of the first and second ends of the additional strap is configured to be connected in at least two positions to one of the at least one first and at least one second girth straps at attachment points, such that a section of the additional strap extending between the attachment points is adjustable to at least two lengths, wherein at least one of the at least one first and at least one second girth straps comprises a girth strap eyelet and the additional strap is arranged through said girth strap eyelet and at least one additional strap eyelet is arranged on a section of the additional strap facing away from the saddle tree, which additional strap eyelet is arranged adjacent to the girth strap eyelet.

2. The saddle according to claim 1, wherein the additional strap is elastically stretchable under tensile load.

3. The saddle according to claim 1, wherein the second end of the additional strap is connected to the at least one second girth strap.

4. The saddle according to claim 1, wherein the additional strap is configured to first load the saddle panels and subsequently load the saddle tree against a horse's back upon loading the girth straps.

5. The saddle according to claim 1, wherein at least one of the attachment points is formed by an adjustable connection which is releasable and closable in at least two positions.

6. The saddle according to claim 1, wherein at least one of the attachment points comprises a latching pin inserted into an eyelet which is arranged on the section of the additional strap facing away from the saddle tree.

7. The saddle according to claim 1, wherein one of the attachment points has an eyelet in which a Y-shaped section of the at least one first girth strap is arranged as a loop.

8. The saddle according to claim 1, wherein the additional strap between comprises a tension spring which is stretchable under tensile load and which extends between the saddle panels.

9. A method for manufacturing a saddle comprising saddle, comprising a saddle tree, at least one first girth strap fixed on one side of the saddle, at least one second girth strap fixed on an opposite side of the saddle, a chamber opening having saddle panels mounted therein, and an additional strap arranged between the saddle tree and the saddle panels, a first end of the additional strap being connected to the at least one first girth strap and an opposite second end of the additional strap being connected to the at least one second girth strap, the method comprising providing a saddle having a saddle tree with at least one girth strap on each of the opposite sides of the saddle, with a chamber opening with saddle panels mounted therein, and arranging an additional strap between the saddle tree and the saddle panels such that the opposite ends of the additional strap are each connectable to one of the girth straps, wherein the additional strap comprises an elastically stretchable section between non-elastically stretchable sections which is arranged in the area between the saddle panels, the non-elastic sections being each connectable to one of said girth straps.

10. The method according to claim 9, wherein the additional strap between sections comprises a tension spring which is stretchable under tensile load, and has at least two spaced eyelets at at least one of its ends.

11. The saddle according to claim 1, wherein the additional strap is connected to the at least one second girth strap beyond the saddle panels.

* * * * *